(12) United States Patent
Chen et al.

(10) Patent No.: US 11,128,797 B2
(45) Date of Patent: Sep. 21, 2021

(54) PHOTOGRAPHING APPARATUS, AND CONTROL METHOD AND DEVICE APPLIED TO PHOTOGRAPHING APPARATUS

(71) Applicant: Beijing Baidu Netcom Science and Technology Co., Ltd., Beijing (CN)

(72) Inventors: Xiangli Chen, Shanghai (CN); Wubiao Guo, Shanghai (CN); Jian Liu, Shanghai (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 0 days.

(21) Appl. No.: 16/762,952

(22) PCT Filed: May 7, 2019

(86) PCT No.: PCT/CN2019/085784
§ 371 (c)(1),
(2) Date: May 11, 2020

(87) PCT Pub. No.: WO2020/007112
PCT Pub. Date: Jan. 9, 2020

(65) Prior Publication Data
US 2020/0396382 A1 Dec. 17, 2020

(30) Foreign Application Priority Data
Jul. 6, 2018 (CN) .......................... 201810737830.0

(51) Int. Cl.
*H04N 5/232* (2006.01)
*H04N 5/225* (2006.01)
(Continued)

(52) U.S. Cl.
CPC ......... *H04N 5/23238* (2013.01); *G03B 15/02* (2013.01); *G03B 15/06* (2013.01);
(Continued)

(58) Field of Classification Search
CPC ............... H04N 5/2253; H04N 5/2256; H04N 5/23218; H04N 5/23238; H04N 5/2354;
(Continued)

(56) References Cited

U.S. PATENT DOCUMENTS

| | | | |
|---|---|---|---|
| 2016/0100087 A1* | 4/2016 | Scheich | H04N 5/2256 348/47 |
| 2016/0381323 A1* | 12/2016 | Garcia, III | G06T 11/60 348/38 |
| 2018/0160019 A1* | 6/2018 | Scheich | H04N 5/247 |

FOREIGN PATENT DOCUMENTS

| | | |
|---|---|---|
| CN | 101909382 A | 12/2010 |
| CN | 102830574 A | 12/2012 |

(Continued)

OTHER PUBLICATIONS

International Search Report and Written Opinion in International Application No. PCT/CN2019/085784, dated Jul. 31, 2019 (8 pages).

*Primary Examiner* — Daniel M Pasiewicz
(74) *Attorney, Agent, or Firm* — Nixon Peabody LLP (57) ABSTRACT

Provided are a photographing apparatus, and a control method and device applied to the photographing apparatus. The photographing apparatus comprises a housing shell, a lighting unit, a guide rail unit and a control unit, communicatively connected with the lighting unit and the guide rail unit, to adjust the light intensity of an object to be photographed in the photographing apparatus.

17 Claims, 5 Drawing Sheets

(51) Int. Cl.
*G03B 15/06* (2021.01)
*G03B 15/07* (2021.01)
*G03B 15/02* (2021.01)
*H04N 5/235* (2006.01)

(52) U.S. Cl.
CPC ........... *G03B 15/07* (2013.01); *H04N 5/2253* (2013.01); *H04N 5/2256* (2013.01); *H04N 5/2354* (2013.01); *H04N 5/23218* (2018.08)

(58) Field of Classification Search
CPC ........ H04N 5/247; G03B 15/02; G03B 15/03; G03B 15/06; G03B 15/07
See application file for complete search history.

(56) References Cited

FOREIGN PATENT DOCUMENTS

| | | |
|---|---|---|
| CN | 203912106 U | 10/2014 |
| CN | 105259730 A | 1/2016 |
| CN | 105937692 A | 9/2016 |
| CN | 108803198 A | 11/2018 |
| JP | 2006-323168 A | 11/2006 |

\* cited by examiner

PHOTOGRAPHING APPARATUS, AND CONTROL METHOD AND DEVICE APPLIED TO PHOTOGRAPHING APPARATUS

CROSS-REFERENCE TO RELATED APPLICATIONS

This application is a U.S. National Stage of International Application Patent No. PCT/CN2019/085784, filed on May 7, 2019, which claims the priority of Chinese Patent Application No. 201810737830.0, entitled "Photographing apparatus, and control method and device applied to photographing apparatus," filed on Jul. 6, 2018 by BEIJING BAIDU NETCOM SCIENCE AND TECHNOLOGY CO., LTD., both of the content of which are incorporated herein by reference in their entireties.

TECHNICAL FIELD

Embodiments of the present disclosure relate to the field of cameras, and specifically to a photographing apparatus, and a method and apparatus for controlling applied to the photographing apparatus.

BACKGROUND

Panoramic images can provide users with full-range viewing angles and immersive video viewing experiences, and have gradually become a hot spot in virtual reality. As the virtual reality technology continues to mature, panoramic content is becoming popular and entering people's lives. People may access a wide variety of panoramic content through various channels.

In the prior art, in order to obtain a panoramic image, a panoramic camera needs to be used for photographing. The panoramic camera is usually provided with two or more lens assemblies, images from a plurality of directions are photographed by the panoramic camera, and then the images from the plurality of directions photographed by the two or more lens assemblies are spliced by a splicing algorithm to obtain the panoramic image.

SUMMARY

Embodiments of the present disclosure propose a photographing apparatus, and a method and apparatus for controlling applied to the photographing apparatus.

In a first aspect, embodiments of the present disclosure provide a photographing apparatus, including a housing, a lighting unit, a guide rail unit, and a control unit. The housing includes a frame structure and a partition plate mounted on the frame structure, the partition plate includes a top plate, a bottom plate, and a side plate, and an end of the side plate is engaged with the top plate. The lighting unit includes a light shielding plate and a lighting lamp, the light shielding plate includes a side surface disposed around an inner wall of the side plate and a bottom surface contacting the bottom plate, and the lighting lamp is disposed on a side of the side surface of the light shielding plate facing the inner wall of the side plate. The guide rail unit includes a guide rail disposed along a side of the side surface of the light shielding plate where the lighting lamp is not disposed, and an adjustable bracket disposed on the guide rail for mounting a photographing device, and the guide rail unit further includes a stepper motor disposed on the adjustable bracket. The control unit is communicatively connected with the lighting unit and the guide rail unit, and the control unit is configured to adjust a light emitting brightness of the lighting lamp in the lighting unit and control a reversal of the stepper motor to control the adjustment bracket to move on the guide rail.

In some embodiments, the inner wall of the side plate and an inner wall of the top plate are coated with a white coating that may diffusely reflect light.

In some embodiments, the side of the side surface of the light shielding plate facing the inner wall of the side plate is coated with a white coating that may diffusely reflect light, and a side of the side surface of the light shielding plate facing away from the inner wall of the side plate is coated with a gray coating.

In some embodiments, the photographing apparatus further includes a rotary turntable for carrying an object, the rotary turntable is disposed on the bottom plate, and the rotary turntable is coated with a gray coating.

In some embodiments, the rotary turntable is provided with a driver for driving the rotary turntable, the driver is communicatively connected with the control unit, the control unit controls the driver to rotate the rotary turntable, and in response to detecting that the rotary turntable stops within a preset control period, controls the photographing device to photograph the object on the rotary turntable.

In some embodiments, the lighting unit further includes a lamp disposed on the inner wall of the top plate, and the lamp disposed on the inner wall of the top plate and a center point of the rotary turntable are located on the same axis along the direction of gravity.

In some embodiments, the top plate has a circular arch shape, and the side plate surrounds a cylindrical shape.

In some embodiments, a door used for entering and exiting is opened on the side plate of the housing, and a distance sensor is provided on the door; and the control unit is communicatively connected with the distance sensor, and is configured to obtain a distance between an object sensed by the distance sensor and the door.

In some embodiments, the control unit is communicatively connected with the light shielding plate to control an expansion and contraction of the light shielding plate according to a height of an object presented inside the housing.

In a second aspect, embodiments of the present disclosure provide a method for controlling applied to a photographing apparatus according to the first aspect. The method includes: controlling, in response to detecting that an object is present inside a housing, a photographing device mounted on an adjustable bracket to obtain an image of the object; determining whether the image satisfies following preset conditions: a brightness of the object presented in the image reaches a preset threshold, and the object presented in the image is located at a preset position of the image; and adjusting, in response to determining that the image does not satisfy the preset conditions, at least one of a brightness of a lighting lamp in the lighting unit or the adjustable bracket.

In some embodiments, the photographing apparatus further includes a rotary turntable for carrying the object, and the rotary turntable is provided with a driver for driving the rotary turntable, and the method further includes: controlling, in response to detecting that the rotary turntable stops within a preset control period, the photographing device to photograph.

In some embodiments, a door used for entering and exiting is opened on a side plate of the housing, and a distance sensor is provided on the door, and the method further includes: obtaining a distance between an object sensed by the distance sensor and the door, and in response to the obtained distance being less than a preset distance, controlling the door to open.

In a third aspect, embodiments of the present disclosure provide an apparatus for controlling applied to a photographing apparatus according to the first aspect. The apparatus includes: a first controlling unit, configured to control, in response to detecting that an object is present inside a housing, a photographing device mounted on an adjustable bracket to obtain an image of the object; a determination unit, configured to determine whether the image satisfies following preset conditions: a brightness of the object presented in the image reaches a preset threshold, and the object presented in the image is located at a preset position of the image; and an adjustment unit, configured to adjust, in response to determining that the image does not satisfy the preset conditions, at least one of a brightness of a lighting lamp or the adjustable bracket.

In some embodiments, the photographing apparatus further includes a rotary turntable for carrying the object, the rotary turntable is provided with a driver for driving the rotary turntable, the driver is communicatively connected with the apparatus for controlling and the photographing device mounted on the adjustable bracket, and the apparatus further includes: a second controlling unit, configured to control, in response to detecting that the rotary turntable stops within a preset control period, the photographing device to photograph.

In some embodiments, a door used for entering and exiting is opened on a side plate of the housing, and a distance sensor is provided on the door, and the apparatus further includes: a third controlling unit, configured to obtain a distance between an object sensed by the distance sensor and the door, and in response to the obtained distance being less than a preset distance, control the door to open.

In a fourth aspect, embodiments of the present disclosure provide a photographing device, including: a camera, a lighting unit, and a guide rail unit; one or more control chips; and a storage apparatus, for storing one or more programs, the one or more programs, when executed by the one or more control chips, cause the one or more control chips to implement the method as in any embodiment of the second aspect.

In a fifth aspect, embodiments of the present disclosure provide a computer readable medium, storing a computer program thereon, the program, when executed by a processor, implements the method as in any embodiment of the second aspect.

The photographing apparatus, and the method and apparatus for controlling applied to the photographing apparatus shown in the embodiments may adjust the light intensity of an object to be photographed in the photographing apparatus, by providing a housing, a lighting unit, a guide rail unit, and a control unit communicatively connected with the lighting unit and the guide rail unit, and at the same time may also make light received by the object to be photographed more uniform, thereby improving an imaging effect of the object to be photographed.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
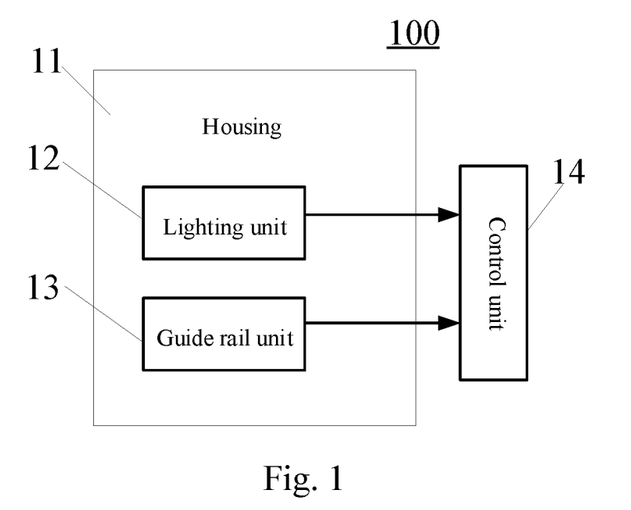
FIG. 1 is a schematic structural diagram of an embodiment of a photographing apparatus according to the present disclosure.
Figure 2:
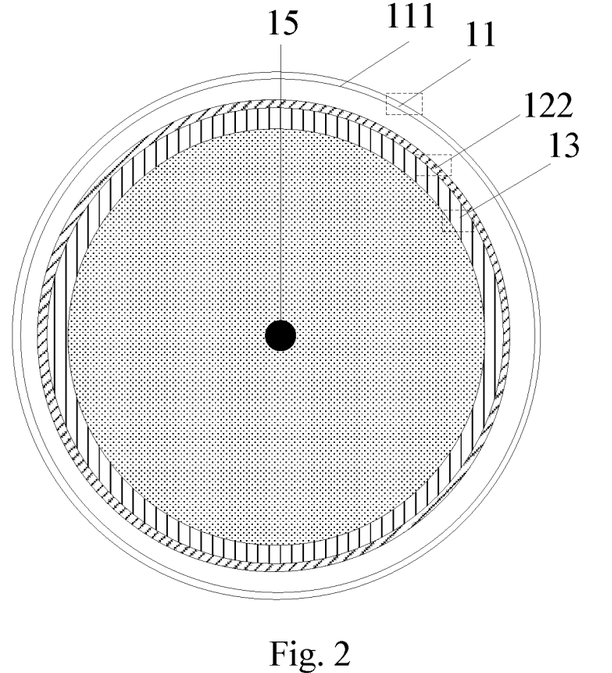
FIG. 2 is a schematic top view of an embodiment of the photographing apparatus according to the present disclosure.
Figure 3:
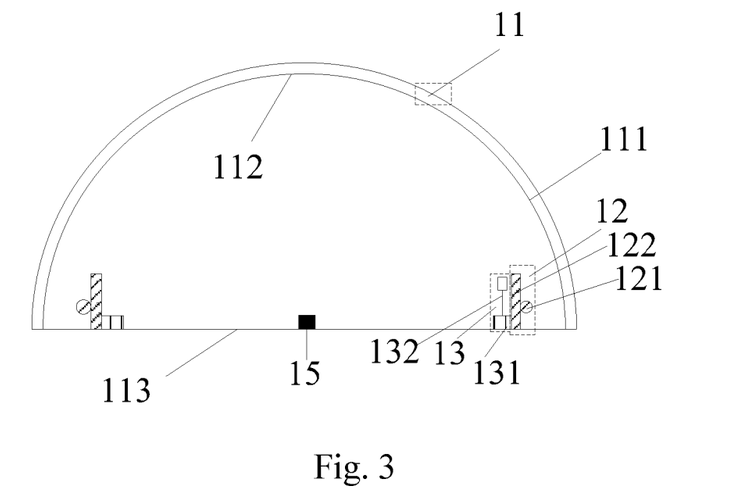
FIG. 3 is a schematic cross-sectional view of an embodiment of the photographing apparatus according to the present disclosure.

FIG. 1 shows a schematic structural diagram of an embodiment of a photographing apparatus according to the present disclosure, FIG. 2 and FIG. 3 respectively show a schematic top view and a schematic cross-sectional view of an embodiment of the photographing apparatus according to the present disclosure. With reference to FIG. 2 and FIG. 3, the photographing apparatus provided in the present disclosure will be specifically described below.

In the present embodiment, a photographing apparatus 100 includes a housing 11, a lighting unit 12, a guide rail unit 13 and a control unit 14.

The housing 11 may include a frame structure and a partition plate mounted on the frame structure. Here, the frame structure may be, for example, formed of a plurality of beams and a plurality of pillars, and one end of the plurality of pillars is connected to the beams, so that the housing 11 forms a three-dimensional structure. The partition plate mounted on the pillars forms a side plate of the housing 11, and the partition plate mounted on the beams forms a top plate. The beam is formed of a plurality of beam components that are connected end to end in a detachable manner. The pillar is formed by connecting a plurality of pillar components to each other, and the pillar components may be detachable connected. The partition plate mounted on the frame structure may include a top plate, a bottom plate, and a side plate. The top plate and the side plate, and the side plate and the bottom plate are respectively connected with each other. Here, the partition plate may be formed of, for example, wood, or may be formed of a material such as an aluminum-magnesium alloy. The side plate of the housing may include an outer wall and an inner wall 111 as shown in FIG. 2. By setting the material of the housing 11 of the photographing apparatus in the form of a partition plate, the photographing apparatus 100 may be made stronger, and stable protection may be provided for a photographing device inside the housing 11 and an object to be photographed. The housing may have various shapes, including but not limited to a circular cylinder, an elliptical cylinder, a triangular prism, a cube, a rectangular parallelepiped, and the like. As shown in FIG. 3, the lighting unit 12 may include a lighting lamp 121 and a light shielding plate 122. Here, the light shielding plate 122 is disposed around the inner wall 111 of the housing 11. That is, when the housing is a cylinder or a hemisphere, the light shielding plate 122 is disposed at a preset distance from the inner wall 111 of the side plate, and at the same time is disposed around the inner wall of the side plate, that is, a top view of the light shielding plate 122 is a concentric circle having the same center as the housing 11. Here, the light shielding plate 122 includes a side surface disposed around the inner wall 111 of the side plate and a bottom surface contacting the bottom plate 113 of the housing 11. The side surface of the light shielding plate 122 further includes a surface facing the inner wall 111 of the side plate of the housing 11 and a surface facing away from the inner wall 111 of the side plate of the housing 11. The lighting lamp 121 is disposed on a surface of the light shielding plate 122 facing the inner wall 111 of the side plate of the housing 11. Here, the lighting lamp 121 may be attached to the light shielding plate 122 through a fixing portion, so that the light shielding plate 122 and the lighting lamp 121 are connected to each other, and at the same time a gap with a preset distance may also be reserved. By setting the gap, it is possible to prevent light emitted by the lighting lamp from being emitted vertically along the light shielding plate 122, thereby affecting the lighting effect of the light emitted by the lighting lamp 121. At the same time, disposing the lighting lamp 121 on the light shielding plate 122 may make the light shielding plate 122 and the lighting lamp 121 form a unified integrated body, saving space inside the housing 11 of the photographing apparatus 100.

In the present embodiment, the lighting lamp 121 may include a flexible bendable material. For example, the lighting lamp 121 may be formed of a light emitting diode and an external flexible lamp cover for protecting the light emitting diode. Therefore, the lighting lamp 121 may form a light strip, which surrounds the light shielding plate 122 to have the same shape as the light shielding plate 122. For example, viewed from the top, when the light shielding plate 122 is circular, the light strip formed by the lighting lamp 121 and the light shielding plate 122 are concentric circles having the same center. The lighting lamp 121 is the outer circle of the concentric circles, and the light shielding plate 122 is the inner circle of the concentric circles. Here, the height of the light shielding plate 122 is higher than the height of the lighting lamp 121, and the height difference is set according to the needs of an application scenario.

In the present embodiment, the lighting lamp 121 is disposed on one side of the side surface of the light shielding plate 122 facing the inner wall 111 of the side surface of the housing 11, so that the light emitted by the lighting lamp 121 directly shines on the inner wall of the housing 11, and diffuses the light to the object to be photographed by diffuse reflection of the inner wall. Thus, it may avoid the lighting lamp 121 from directly illuminating an item that needs to be taken an image inside the housing, improve the problem that the item's brightness is too high due to the direct illumination of the lighting on the item so that the color of the item is distorted, and the true color of the item cannot be restored. At the same time, it may improve the softness of the light, and improve the display effect of a photographed image. At the same time, the lighting lamp 121 is disposed as a light strip and is disposed around the light shielding plate 122, that is, it is disposed around the inner wall 111 of the side plate of the housing 11, so that the light projected to the object is consistent from all directions, and the light projected to the object to be photographed may be more uniform, improving the imaging effect of the object to be photographed.

In the present embodiment, both the inner wall 111 of the side plate of the housing 11 and the side surface of the light shielding plate 122 are made of non-smooth materials, so that the reflection effect of diffuse reflection of light may be improved.

In the present embodiment, both the inner wall 111 of the side plate and the inner wall of the top plate of the housing 11 are coated with a coating that may diffusely reflect light. Here, the coating may be set, for example, according to the color of the object.

Preferably, the inner wall 111 of the side plate and the inner wall 112 of the top plate of the housing 11 are coated with a white coating. Since white may reflect light of all colors, the coating of the inner wall 111 of the side plate and the inner wall 112 of the top plate of the housing 11 is set to white, which may further improve a diffuse reflection effect of light.

Preferably, the top plate of the housing 11 has a circular arch shape, and the side plate surrounds a cylindrical shape. By limiting the shapes of the top plate and the side plate of the housing 11, the right angle of the inner wall of the housing 11 may be reduced, and the uniformity of diffuse reflection light may be improved.

Preferably, the side surface of the light shielding plate 122 is coated with a coating that may diffusely reflect light. The color of the coating may be selected according to the needs of an application scenario.

Preferably, the color of the coating applied on the side of the side surface of the light shielding plate 122 facing the inner wall 111 of the side plate of the housing 11 may be set to white, and the color of the side of the side surface of the light shielding plate 122 facing away from the inner wall 111 of the side plate of the housing 11, that is, the coating applied to the side facing the object, may be set to gray. For example, the color values of the three primary colors of red, yellow, blue of the gray may be 127, 127, and 127, respectively. By coating the side surface of the light shielding plate 122 with two different colors of white and gray, the diffuse reflection of light may be improved, at the same time, the contrast between the object and the surrounding environment may be improved, which may avoid that the sensitivity of the photographed image is too high or too low to make the color of the photographed picture too simple, so that the color saturation may be improved.

In the present embodiment, as shown in FIG. 3, the guide rail unit 13 may include a guide rail 131 and an adjustable bracket 132 disposed on the guide rail 131 for mounting a photographing device. Here, the guide rail 131 is disposed on one surface of the light shielding plate 122 facing away from the inner wall 111 of the side plate of the housing 11, and at the same time the width of the guide rail 131 may be set according to the size of the housing 11. The guide rail 131 is disposed adjacent to the light shielding plate 122, and the distance to the light shielding plate 122 may also be set in advance. The adjustable bracket 132 may further be provided with a stepper motor, and the positive and negative rotation of the stepper motor may be controlled to make the adjustable bracket move on the guide rail. Here, the guide rail may surround the inner wall 111 of the side plate of the housing 11 for one circle, so that the photographing apparatus may realize panoramic photographing. The slide track of the guide rail may be a straight track, a bent track or a curved track, etc., depending on the specific scenario. Here, the adjustable bracket may be expanded and contracted, so that the height of the bracket may be adjusted; and the adjustable bracket may also be adjusted in angle to adjust the viewing angle between the photographing device and the object. Here, the photographing device may include, for example, a camera, a video camera, and the camera or the lens assembly provided by the video camera includes, but is not limited to, a wide-angle lens assembly, a telephoto lens assembly, a fisheye lens assembly, an ordinary single-lens lens assembly, and the like.

In the present embodiment, the object to be photographed is usually disposed at a center position 15 of the bottom plate. In this way, the light from all directions received by the object to be photographed is consistent.

In the present embodiment, the photographing apparatus 100 may further include the control unit 14. The control unit 14 is communicatively connected to the lighting unit 12 and the guide rail unit 13. Here, the communication connection includes, but is not limited to, a wired connection, a wireless connection, and the like. Here, the control unit 14 may be provided inside the housing 11 or outside the housing 11. The control unit 14 may be used to adjust a light emitting brightness of the lighting lamp in the lighting unit 12 and control the reversal of the stepper motor in the guide rail unit 13 to control the adjustable bracket to move on the guide rail. Here, the control unit 14 includes, but is not limited to, a programmable control logic, a single chip computer, a mobile phone provided with a control application, a computer, and the like.

In some alternative implementations of the present embodiment, the control unit 14 is communicatively connected with the light shielding plate 122 to control an expansion and contraction of the light shielding plate 122 according to the height of an object presented inside the housing 11.

Specifically, a sensor chip is disposed on the light shielding plate 122, and the sensor chip may be communicatively connected with the control unit 14. The control unit 14 may adjust the height of the light shielding plate 122 according to the height of the object to be photographed inside the housing 11. Generally, the height of the light shielding plate 122 depends on the height of the specific object. The control unit may store a corresponding relationship table between the height of objects in a preset object category and the height of the light shielding plate. When the control unit detects the category of the object to be photographed, it queries the height of the object, and sends a height adjustment instruction to the sensor chip of the light shielding plate 122. After the sensor chip on the light shielding plate 122 receives the instruction, the height of the light shielding plate 122 may be adjusted. For example, when the object to be photographed is a car, the height of the light shielding plate 122 may be adjusted to be the same as the height at the highest point of the tires of the car. In this way, the height of the light shielding plate does not need to be manually adjusted, which improves the imaging effect of the object and at the same time also improves the work efficiency of the photographing apparatus.

As can be seen from FIG. 1 to FIG. 3, in the present embodiment, by setting the lighting unit 12, the guide rail unit 13 inside the housing 11, and the control unit 14 in communication connection with the lighting unit 12 and the guide rail unit 13, the light intensity of the object to be photographed in the photographing apparatus 100 may be adjusted, and at the same time it may also make light received by the object to be photographed more uniform, thereby improving the imaging effect of the object to be photographed.

Figure 4:
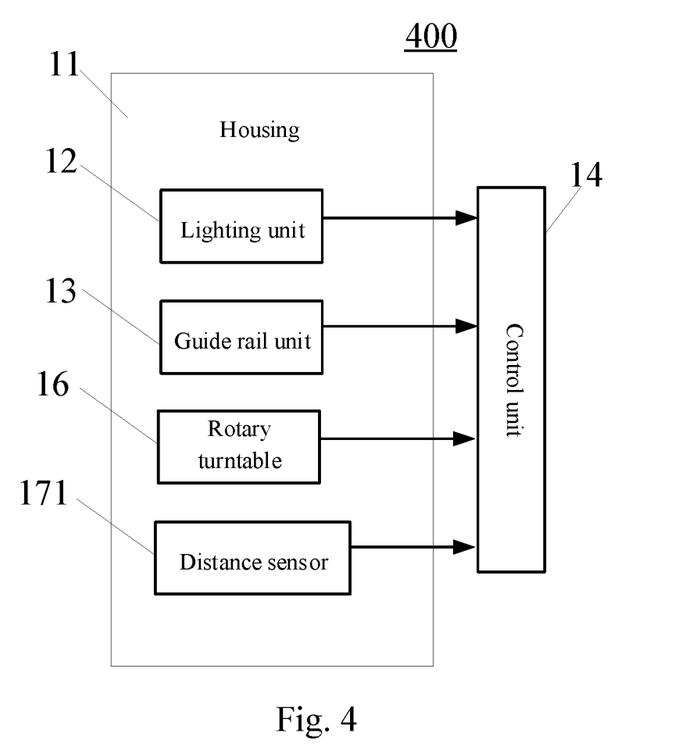
FIG. 4 is a schematic structural diagram of another embodiment of the photographing apparatus according to the present disclosure.
Figure 5:
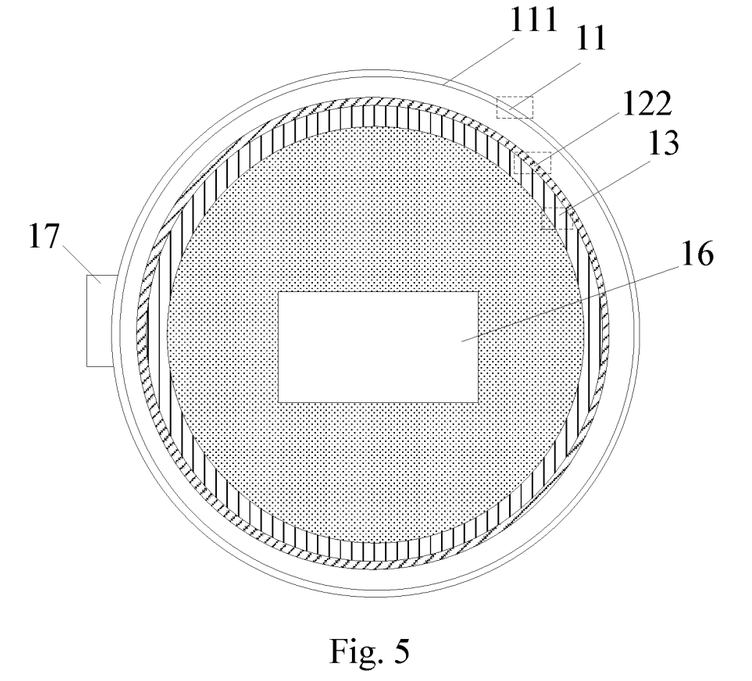
FIG. 5 is a schematic top view of another embodiment of the photographing apparatus according to the present disclosure.
Figure 6:
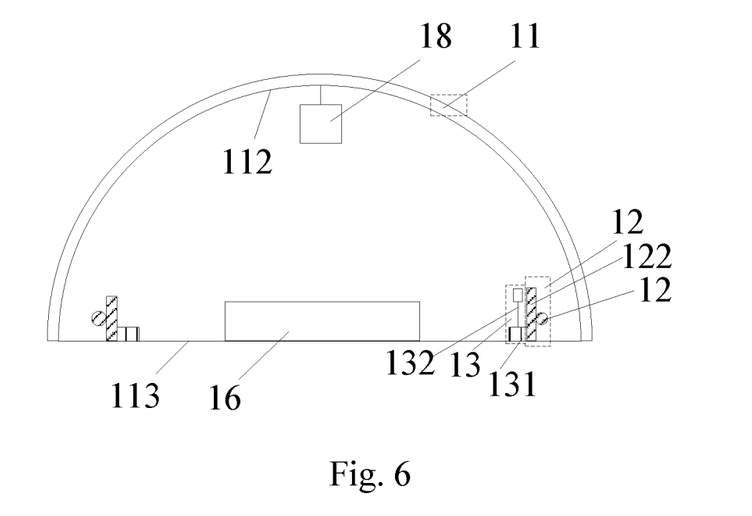
FIG. 6 is a schematic cross-sectional view of another embodiment of the photographing apparatus according to the present disclosure.

With further reference to FIG. 4 to FIG. 6, FIG. 4 shows a schematic structural diagram of another embodiment of the photographing apparatus according to the present disclosure, FIG. 5 and FIG. 6 respectively show a schematic top view and a schematic cross-sectional view of another embodiment of the photographing apparatus according to the present disclosure. With reference to FIG. 4 to FIG. 6, another embodiment of the photographing apparatus provided in the present disclosure will be specifically described.

In the present embodiment, a photographing apparatus 400 includes the housing 11, the lighting unit 12, the guide rail unit 13 and the control unit 14. The housing 11 may include a frame structure and a partition plate mounted on the frame structure. The partition plate includes a side plate, a bottom plate, and a top plate 113. The side plate includes an inner wall 111, and the top plate includes an inner wall 112. The lighting unit 12 includes a lighting lamp 121 and a light shielding plate 122. The guide rail unit 13 includes a guide rail 131 and an adjustable bracket 132 disposed on the guide rail 131 for mounting a photographing device. The control unit 14 is electrically connected to the lighting unit 12 and the guide rail unit 13, to adjust a light emitting brightness of the lighting lamp in the lighting unit 12 and control the reversal of a stepper motor in the guide rail unit 13 to control the adjustable bracket to move on the guide rail. For the specific connection manner and beneficial effects brought of the housing 11, the lighting unit 12, the guide rail unit 13, and the control unit 14 shown in the present embodiment, reference may be made to the photographing apparatus 100 shown in FIGS. 1-3, and detailed description thereof will be omitted.

It can be seen from FIGS. 4 to 6 that, unlike the embodiment shown in FIGS. 1 to 3, the present embodiment further includes a rotary turntable 16 for carrying an object and a door 17 that may be used for entering and exiting disposed on the side plate of the housing 11.

Here, the rotary turntable 16 is disposed on the bottom plate 113 of the housing 11 and at the center position of the housing 11. Here, the center position is that the distances from the directions of the housing 11 to the rotary turntable 16 are equal within a preset error range. Therefore, light projected from the inside of the housing 11 to the rotary turntable 16 is more uniform, and the uniformity of the light intensity of the object is improved.

In the present embodiment, the rotary turntable may be coated with a gray coating. By coating the gray coating, the diffuse reflection of light may be improved, and at the same time, the contrast between the object and the surrounding environment may be improved, which may avoid that the sensitivity of a photographed image is too high or too low to make the color of the photographed picture too simple, so that the color saturation may be improved.

In the present embodiment, the rotary turntable 16 may be provided with a driver for driving the rotary turntable, the driver is communicatively connected with the control unit 14, the control unit 14 controls the driver to rotate the rotary turntable, and in response to detecting that the rotary turntable stops within a preset control period, controls the photographing device to photograph the object on the rotary turntable.

In the present embodiment, a distance sensor 171 may be provided on the door 17 that may be used for entering and exiting disposed on the side plate of the housing 11. The distance sensor 171 is communicatively connected with the control unit 14. The control unit 14 may obtain a distance between an object sensed by the distance sensor 171 and the door, thereby controlling the opening and closing of the door. By providing the distance sensor 171 on the door 17, it is not necessary to manually control the opening of the door, and the flexibility of the photographing apparatus 400 is improved.

In the present embodiment, by adding the rotary turntable 16 and the door 17, the photographing apparatus may be made more flexible and easy to control, and a panoramic view of the object photographed may be made clearer.

In some alternative implementations of the present embodiment, the lighting unit further includes a lamp 18 disposed on the inner wall 113 of the top plate of the housing 11. The center point of the lamp 18 and the center point of the rotary turntable 16 are located on the same axis along the direction of gravity. By setting the lamp 18, direct light may be provided to the object to be photographed in an application scenario that requires light to be directly projected onto the object to be photographed, so that high-intensity fill light may be applied to the object to be photographed, and the imaging effect of the object to be photographed may be further improved.

Figure 7:
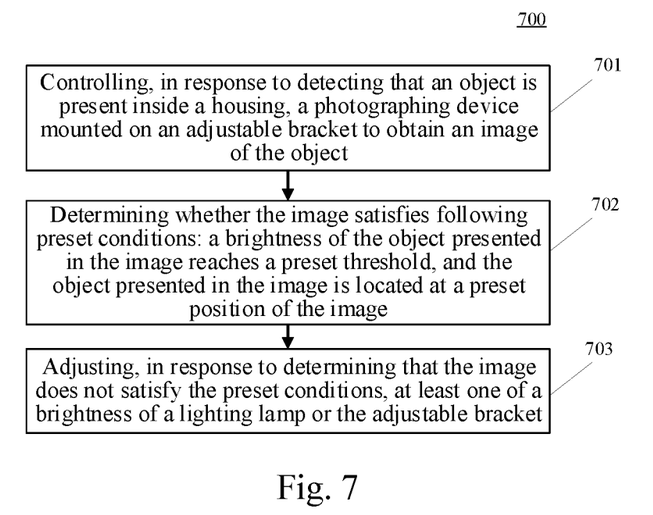
FIG. 7 is a flowchart of an embodiment of a method for controlling applied to a photographing apparatus according to the present disclosure.

With further reference to FIG. 7, illustrating a flow 700 of a method for controlling applied to the photographing apparatus shown in any one of the embodiments provided in the present disclosure.

In the present embodiment, the method for controlling is usually provided in the control unit of the photographing apparatus. The control unit may be software or hardware. When the control unit is hardware, it may be a single-chip computer, a programmable logic controller, a computer, a mobile phone, and the like. When the control unit is software, it may be installed in the electronic devices listed above, which may be implemented as multiple software or software modules, or may be implemented as a single software or software module, which is not limited herein. The method for controlling includes the following steps.

Step 701, controlling, in response to detecting that an object is present inside a housing, a photographing device mounted on an adjustable bracket to obtain an image of the object.

In the present embodiment, an executing body (for example, the control unit shown in FIG. 1 or FIG. 4) of the method for controlling may detect in real time whether an object is present inside the housing. Here, the object is an object to be photographed, and may be, for example, a car, a toy, an exhibit, etc., which is not limited herein. A pressure sensor may be provided at a position inside the housing for placing the object. The executing body may receive a detection signal from the pressure sensor. When the pressure value of the pressure sensor received changes and is greater than a preset threshold, it may be determined that an object is present inside the housing.

In the present embodiment, in response to detecting that an object is present inside the housing, the executing body may control the photographing device mounted on the adjustable bracket to obtain the image of the object. Here, the executing body may be communicatively connected with the photographing device, and the executing body may send an instruction or a signal to photograph an image to the photographing device. Upon receiving the instruction or signal, the photographing device turns on a photographing function to obtain the image of the object.

Step 702, determining whether the image satisfies following preset conditions: a brightness of the object presented in the image reaches a preset threshold; and the object presented in the image is located at a preset position of the image.

In the present embodiment, based on the image obtained by the photographing device in step 701, the executing body may examine the obtained image, so as to determine whether the image satisfies the preset conditions. Here, the executing body may examine the image by using an image recognition technology such as a convolutional neural network. By examining the image, the executing body may determine whether the brightness of the object presented in the image reaches the preset threshold. Here, reaching the preset threshold may be, for example, included within a preset threshold range, so as to ensure that the brightness of the image is not too high or too low, and improve the image quality. The executing body may also determine whether the object presented in the image is located at the preset position of the image. Here, the preset position may include, for example, whether the object is located in the center of the image, whether the proportion of the object in the image reaches a preset threshold, and the like.

Step 703, adjusting, in response to determining that the image does not satisfy the preset conditions, at least one of a brightness of a lighting lamp or the adjustable bracket.

In the present embodiment, in response to determining that the image does not satisfy the preset conditions, the executing body may determine whether the brightness of the object presented in the image does not reach the preset threshold or the object presented in the image is not at the preset position of the image. If both of the two conditions are not satisfied, the brightness of the lighting lamp may be adjusted, and the height of the adjustable bracket or a shooting angle may be adjusted. If only one condition is not satisfied, the associated device that does not satisfy the condition may be adjusted to satisfy the condition.

In some alternative implementations of the present embodiment, the photographing apparatus further includes a rotary turntable for carrying an object, the rotary turntable is provided with a driver for driving the rotary turntable, and the method further includes: controlling, in response to detecting that the rotary turntable stops within a preset control period, the photographing device to photograph.

Specifically, the executing body may control the driver to drive the rotary turntable to rotate and stop within the preset control period. Here, the preset control period may include, for example, a period of the rotary turntable rotating for one circle, a period of rotating for two circles, and the like. In order to realize photographing the object disposed on the rotary turntable from a plurality of angles to synthesize a panoramic image of the object to be photographed, the executing body may control the rotary turntable to stand still for a preset time for each preset angle of rotation within a control period. For example, the one control period may be one circle rotation of the rotary turntable, that is, 360 degrees. Within the control period, the rotary turntable may be stopped 16 times, and stand still for 3 seconds each time, that is, the rotary turntable is stopped for 3 seconds every 22.5 degrees. When the rotary turntable stops, the driver connected to the executing body may send a stop signal to the executing body. When the executing body detects the stop signal, the executing body controls the photographing device to photograph the object on the rotary turntable. In this way, the executing body realizes a linkage between the rotary turntable and the photographing device, and improves the accuracy of a photographed image. It is worth noting here that the number of times the rotary turntable stops and the time of each stop within a control period may be specifically set according to the needs of the scenario.

In some alternative implementations of the present embodiment, a door used for entering and exiting is opened on a side plate of the housing, and a distance sensor is provided on the door, and the method further includes: obtaining a distance between an object sensed by the distance sensor and the door, and in response to the obtained distance being less than a preset distance, controlling the door to open.

Figure 8:
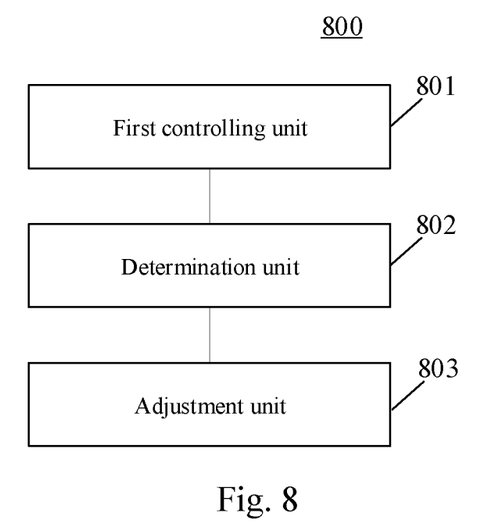
FIG. 8 is a flowchart of an embodiment of an apparatus for controlling applied to a photographing apparatus according to the present disclosure.

With further reference to FIG. 8, as an implementation of the method shown in the above figures, the present disclosure provides an embodiment of an apparatus for controlling applied to a photographing apparatus, and the apparatus embodiment corresponds to the method embodiment as shown in FIG. 7.

With further reference to FIG. 8, the photographing apparatus includes a housing, a lighting unit, a guide rail unit, and a control unit. The housing includes a frame structure and a top plate, a bottom plate, and a side plate of a partition plate. The control unit is communicatively connected with the lighting unit and the guide rail unit. The apparatus for controlling includes: a first controlling unit 801, configured to control, in response to detecting that an object is present inside a housing, a photographing device mounted on an adjustable bracket to obtain an image of the object; a determination unit 802, configured to determine whether the image satisfies following preset conditions: a brightness of the object presented in the image reaches a preset threshold; and the object presented in the image is located at a preset position of the image; and an adjustment unit 803, configured to adjust, in response to determining that the image does not satisfy the preset conditions, at least one of a brightness of a lighting lamp or the adjustable bracket.

In the present embodiment, in the apparatus 800 for controlling applied to a photographing apparatus, for specific processing and the technical effects thereof brought by the first controlling unit 801, the determination unit 802, and the adjustment unit 803, reference may be respectively made to the related description of steps 701, 702, and 703 in the corresponding embodiment of FIG. 7, and detailed description thereof will be omitted.

In some alternative implementations of the present embodiment, the photographing apparatus further includes a rotary turntable for carrying the object, the rotary turntable is provided with a driver for driving the rotary turntable, the driver is communicatively connected with the control unit and the photographing device mounted on the adjustable bracket, and the apparatus 800 for controlling further includes: a second controlling unit (not shown), configured to control, in response to detecting that the rotary turntable stops within a preset control period, the photographing device to photograph.

In some alternative implementations of the present embodiment, a door used for entering and exiting is opened on a side plate of the housing, and a distance sensor is provided on the door, and the apparatus 800 for controlling further includes: a third controlling unit (not shown in the figure), configured to obtain a distance between an object sensed by the distance sensor and the door, and in response to the obtained distance being less than a preset distance, control the door to open.

Figure 9:
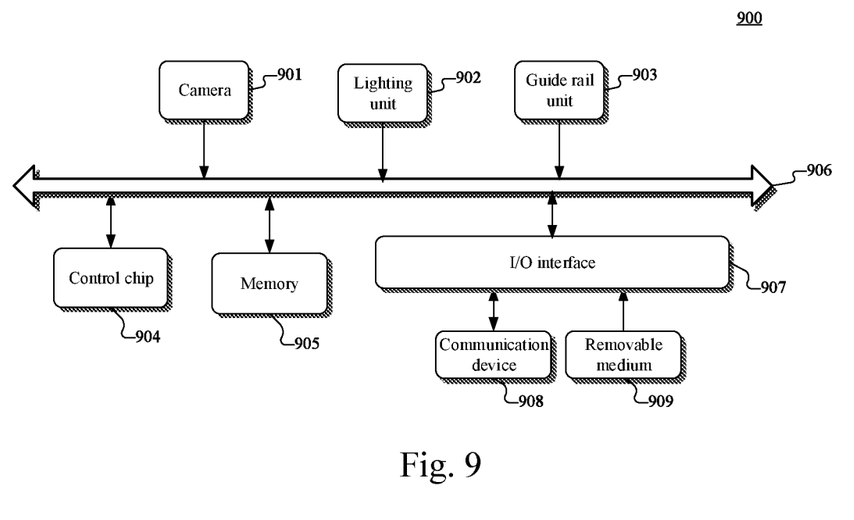
FIG. 9 is a schematic diagram of a hardware structure suitable for implementing the photographing apparatus of the embodiments of the present disclosure.

With further reference to FIG. 9, illustrating a schematic diagram of a hardware structure suitable for implementing the photographing apparatus of the embodiments of the present disclosure. The structure of the photographing device shown in FIG. 9 is only an example, and should not impose any limitation on the functions and use scope of the embodiments of the present disclosure.

As shown in FIG. 9, a photographing device 900 includes a camera 901, a lighting unit 902, a guide rail unit 903, a control chip 904, and a memory 905. The control chip 904 includes an image processor GPU. The camera 901, the lighting unit 902, the guide rail unit 903, the control chip 904, and the memory 905 are connected to each other through a bus 906. An input/output (I/O) interface 907 is also connected to the bus 906. Here, the method according to the present disclosure may be implemented as a computer program and stored in the memory 905. The control chip 904 in the photographing apparatus 900 specifically implements an image analysis function defined in the method of the present disclosure by calling the computer program stored in the memory 905.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication device 908, and/or installed from a removable medium 909. The computer program, when executed by the image processor (GPU) in the control chip 904, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wired, optical cable, RF (radio frequency), etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a first controlling unit, a determination unit, and an adjustment unit. Here, the names of these units do not in some cases constitute limitations to such units themselves. For example, the first controlling unit may also be described as "a unit configured to control a photographing device mounted on an adjustable bracket to obtain an image of the object."

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: control, in response to detecting that an object is present inside a housing, a photographing device mounted on an adjustable bracket to obtain an image of the object; determine whether the image satisfies following preset conditions: a brightness of the object presented in the image reaches a preset threshold, and the object presented in the image is located at a preset position of the image; and adjust, in response to determining that the image does not satisfy the preset conditions, at least one of a brightness of a lighting lamp or the adjustable bracket.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A photographing apparatus, comprising a housing, a lighting unit, a guide rail unit, and a control unit, wherein:
   the housing comprises a frame structure and a partition plate mounted on the frame structure, the partition plate comprises a top plate, a bottom plate, and a side plate, and an end of the side plate is engaged with the top plate;
   the lighting unit comprises a light shielding plate and a lighting lamp, the light shielding plate comprises a side surface disposed around an inner wall of the side plate and a bottom surface contacting the bottom plate, and the lighting lamp is disposed on a side of the side surface of the light shielding plate facing the inner wall of the side plate;
   the guide rail unit comprises a guide rail disposed along a side of the side surface of the light shielding plate where the lighting lamp is not disposed, and an adjustable bracket disposed on the guide rail for mounting a photographing device, and the guide rail unit further comprises a stepper motor disposed on the adjustable bracket; and
   the control unit is communicatively connected with the lighting unit and the guide rail unit, and the control unit is configured to adjust a light emitting brightness of the lighting lamp in the lighting unit and control a reversal of the stepper motor to control the adjustable bracket to move on the guide rail.

2. The photographing apparatus according to claim 1, wherein the inner wall of the side plate and an inner wall of the top plate are coated with a white coating that diffusely reflects light.

3. The photographing apparatus according to claim 1, wherein the side of the side surface of the light shielding plate facing the inner wall of the side plate is coated with a white coating that diffusely reflects light, and a side of the side surface of the light shielding plate facing away from the inner wall of the side plate is coated with a gray coating.

4. The photographing apparatus according to claim 1, wherein the photographing apparatus further comprises a rotary turntable for carrying an object, the rotary turntable is disposed on the bottom plate, and the rotary turntable is coated with a gray coating.

5. The photographing apparatus according to claim 4, wherein the rotary turntable is provided with a driver for driving the rotary turntable, the driver is communicatively connected with the control unit, the control unit controls the driver to rotate the rotary turntable, and in response to detecting that the rotary turntable stops within a preset control period, controls the photographing device to photograph the object on the rotary turntable.

6. The photographing apparatus according to claim 4, wherein the lighting unit further comprises a lamp disposed on the inner wall of the top plate, and the lamp disposed on the inner wall of the top plate and a center point of the rotary turntable are located on a same axis along a direction of gravity.

7. The photographing apparatus according to claim 1, wherein the top plate has a circular arch shape, and the side plate surrounds a cylindrical shape.

8. The photographing apparatus according to claim 1, wherein a door used for entering and exiting is opened on the side plate of the housing, and a distance sensor is provided on the door; and
the control unit is communicatively connected with the distance sensor, and is configured to obtain a distance between an object sensed by the distance sensor and the door.

9. The photographing apparatus according to claim 1, wherein the control unit is communicatively connected with the light shielding plate to control an expansion and contraction of the light shielding plate according to a height of an object presented inside the housing.

10. A method for controlling applied to the photographing apparatus according to claim 1, the method comprising:
controlling, in response to detecting that an object is present inside a housing, a photographing device mounted on an adjustable bracket to obtain an image of the object;
determining whether the image satisfies following preset conditions: a brightness of the object presented in the image reaches a preset threshold, and the object presented in the image is located at a preset position of the image; and
adjusting, in response to determining that the image does not satisfy the preset conditions, at least one of a brightness of a lighting lamp in the lighting unit or the adjustable bracket.

11. The method according to claim 10, wherein the photographing apparatus further comprises a rotary turntable for carrying the object, and the rotary turntable is provided with a driver for driving the rotary turntable, and the method further comprises:
controlling, in response to detecting that the rotary turntable stops within a preset control period, the photographing device to photograph.

12. The method according to claim 10, wherein a door used for entering and exiting is opened on a side plate of the housing, and a distance sensor is provided on the door, and the method further comprises: obtaining a distance between an object sensed by the distance sensor and the door, and in response to the obtained distance being less than a preset distance, controlling the door to open.

13. An apparatus for controlling applied to the photographing apparatus according to claim 1, the apparatus comprising:
at least one processor; and
a memory storing instructions, wherein the instructions when executed by the at least one processor, cause the at least one processor to perform operations, the operations comprising:
controlling, in response to detecting that an object is present inside a housing, a photographing device mounted on an adjustable bracket to obtain an image of the object;
determining whether the image satisfies following preset conditions: a brightness of the object presented in the image reaches a preset threshold, and the object presented in the image is located at a preset position of the image; and
adjusting, in response to determining that the image does not satisfy the preset conditions, at least one of a brightness of a lighting lamp or the adjustable bracket.

14. The apparatus according to claim 13, wherein the photographing apparatus further comprises a rotary turntable for carrying the object, and the rotary turntable is provided with a driver for driving the rotary turntable, and the operations further comprise:
controlling, in response to detecting that the rotary turntable stops within a preset control period, the photographing device to photograph.

15. The apparatus according to claim 13, wherein a door used for entering and exiting is opened on a side plate of the housing, and a distance sensor is provided on the door, and the operations further comprise:
obtaining a distance between an object sensed by the distance sensor and the door, and in response to the obtained distance being less than a preset distance, controlling the door to open.

16. A photographing device, comprising:
a camera, a lighting unit, and a guide rail unit;
one or more control chips; and
a storage apparatus, for storing one or more programs,
the one or more programs, when executed by the one or more control chips, cause the one or more control chips to implement the method according to claim 10.

17. A non-transitory computer readable medium, storing a computer program thereon, the program, when executed by a processor, cause the processor to implement the method according to claim 10.

* * * * *